United States Patent [19]

Fety et al.

[11] Patent Number: 5,214,720
[45] Date of Patent: May 25, 1993

[54] IMAGE PROCESSING METHOD FOR THE DETECTION OF THE HORIZON AND DEVICE FOR THE IMPLEMENTATION THEREOF

[75] Inventors: Luc Fety, Viels-Maisons; Michel Terre; Xavier Noreve, both of Paris, all of France

[73] Assignee: Thomson TRT Defense, Paris, France

[21] Appl. No.: 732,917

[22] Filed: Jul. 19, 1991

[30] Foreign Application Priority Data

Jul. 27, 1990 [FR] France ................... 90 09614

[51] Int. Cl.[5] .............................................. G06K 9/20
[52] U.S. Cl. ........................................ 382/48; 382/30; 382/34
[58] Field of Search ............... 358/103, 105, 108, 109, 358/113, 160; 382/1, 30, 34, 48

[56] References Cited

U.S. PATENT DOCUMENTS

| | | | |
|---|---|---|---|
| 4,223,345 | 9/1980 | Hannigan | 382/34 |
| 4,400,727 | 8/1983 | Aron | 358/103 |
| 4,497,065 | 1/1985 | Tisdale et al. | 382/48 |
| 4,845,610 | 7/1989 | Parvin | 382/30 |
| 5,109,435 | 4/1992 | Lo et al. | 358/105 |

*Primary Examiner*—Jose L. Couso
*Attorney, Agent, or Firm*—Oblon, Spivak, McClelland, Maier & Neustadt

[57] ABSTRACT

According to the method, after a step for the digital processing of the video signal of the image analyzed by rows, there is determined, for each row, on the basis of the distribution of the mean light energy values below and above each position of the row, a step modelling function, the jump position of which gives the position of the horizon in this row. The device used to implement this method includes a sampler of the video signal coupled with a flip flop memory through an accumulator which adds up the luminance values row by row, and a processor which, on the basis of the distribution of the mean light energy levels, computes the signal to be subtracted from the digital video signal by means of a subtractor. The disclosed method and device can be applied to the detection of the horizon from an image analyzed by columns or by lines.

7 Claims, 3 Drawing Sheets

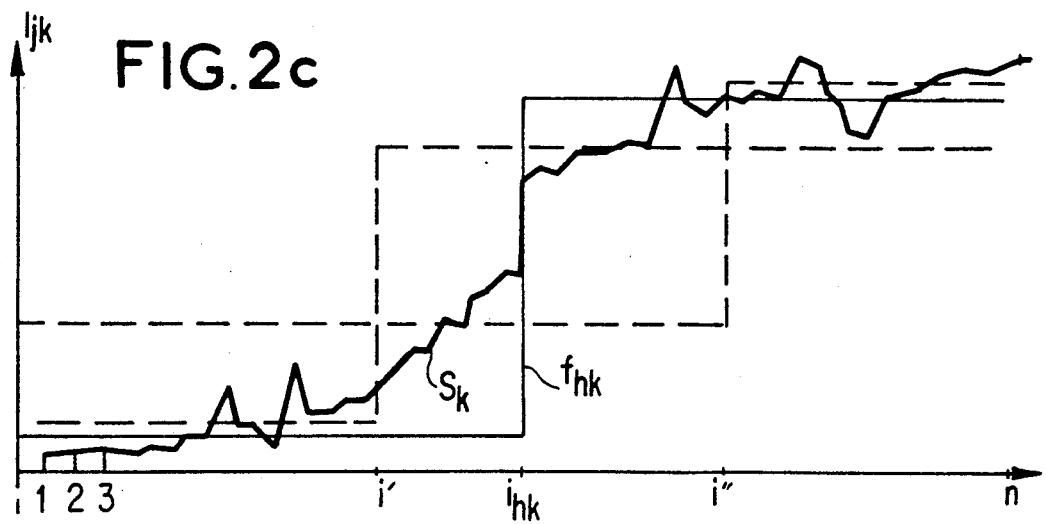
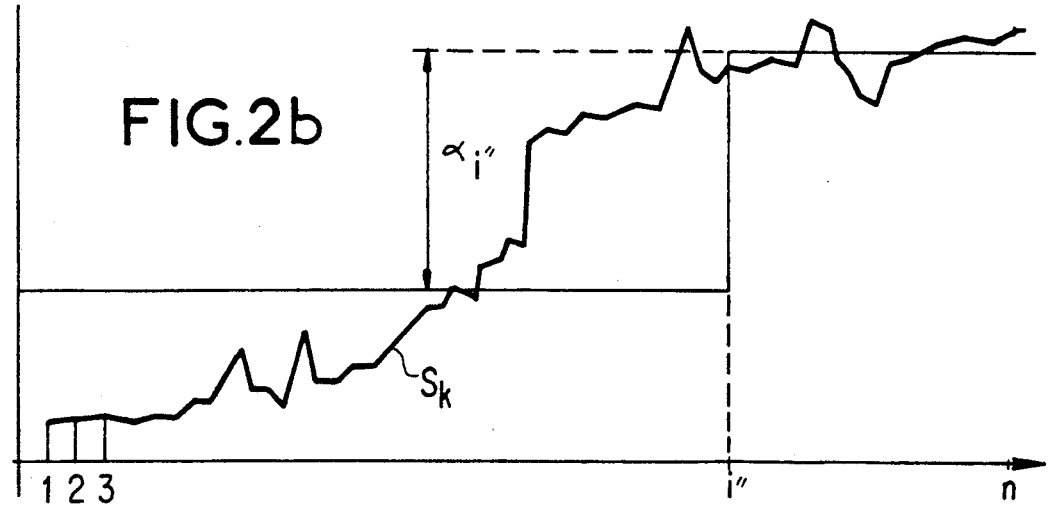
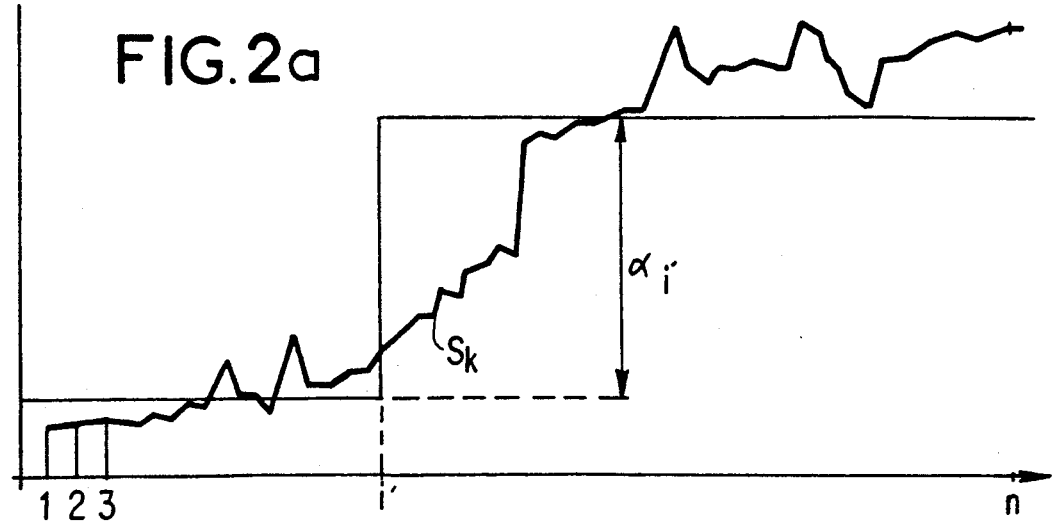

IMAGE PROCESSING METHOD FOR THE DETECTION OF THE HORIZON AND DEVICE FOR THE IMPLEMENTATION THEREOF

BACKGROUND OF THE INVENTION

1. Field of the Invention

The invention relates to the field of image processing with a view to the automatic detection of the horizon that appears in these images.

The automatic detection of the horizon is a determining factor in certain applications, such as surveillance systems, piloting assistance, target-detection assistance, etc.

2. Description of the Related Art

Among known detection methods, te may distinguish methods fo the preparation of artificial horizons and methods for the detection of the horizon in an image from a video signal delivered by a camera. The former methods are based on a positional and directional locating of the aircraft by means of an inertial unit, and the latter are based on image processing systems that use different attributes or parameters characteristic of the horizon (for example, the study of the luminance gradients).

The known methods lack precision, both in the plane of the spatial localization and in that of the temporal determination. For the first category of methods, the determination of the horizon is absolute, without taking account of the true relief, for it is used only to define the trim of the aircraft. For the second category of methods, the lack of precision is expressed by a high degree of noise which may even result in the providing of an aberrant element of information.

SUMMARY OF THE INVENTION

The invention seeks to overcome these drawbacks by proposing a method that uses image processing operations enabling the automatic detection of the horizon with high precision, in real time, and for all the possible positions of the horizon. The invention also concerns a method for the implementation of this method.

To achieve these goals, the image processing method, according to the invention, for the detection of the horizon from a video signal given by a thermal camera, comprises the following steps:

the digital processing of the video signal to obtain the sampled luminance values of the analyzed image row by row;

the determination, for each position i of a given row k, of a step modelling function, the jump of which is located at i and the amplitude of which is computed so as to give a minimal error of all the values assumed by the function with respect to all the values of the luminance signal of the row considered;

the selection of the value $i_{hk}$ of i, corresponding to the position of the horizon on the row considered, for which the step function determined at the previous step has an amplitude computed so as to give the smallest of all the minimal errors;

the reproduction of the preceding steps for all the rows of the analyzed image and the display of a smoothing curve, representing the horizon, from the set of the values $i_{hk}$ selected.

BRIEF DESCRIPTION OF THE DRAWINS

The present invention shall be understood more clearly, and other characteristics and advantages shall appear from the reading of the following description, made with reference to the appended drawings of which respectively:

FIGS. 2a to 2c are modellings of the luminance signal of a given column of the image analyzed in the form of Heaviside functions;

DESCRIPTION OF THE PREFERRED EMBODIMENT

Figure 1:
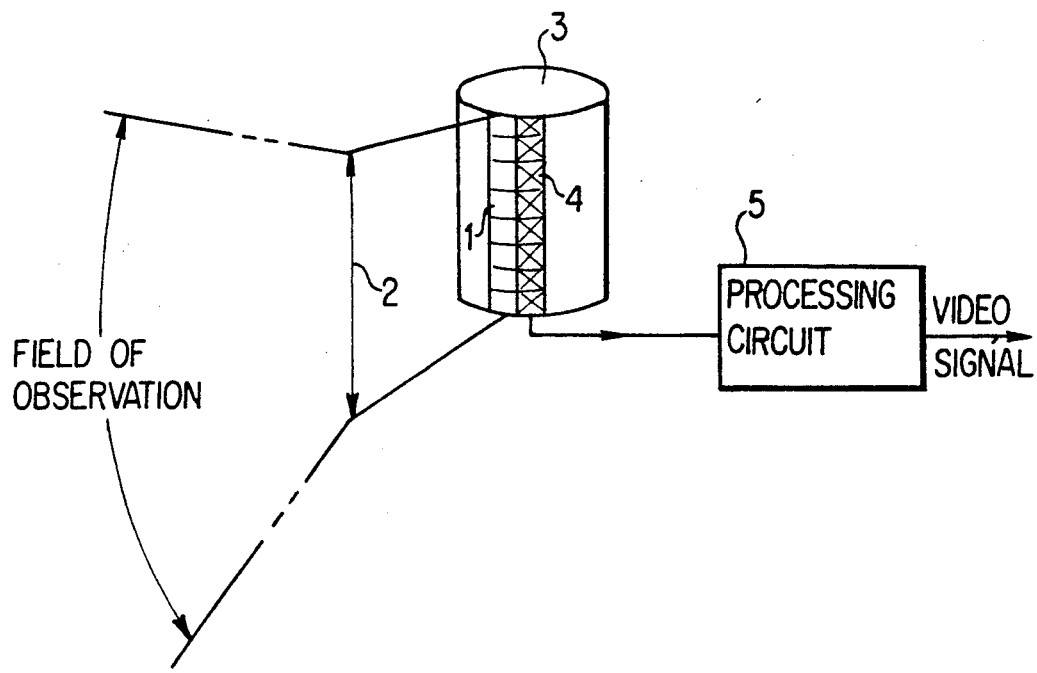
FIG. 1 is a drawing showing the structure of a panoramic thermal camera.

The field of observation is analyzed row by row by a thermal camera, i.e. column by column or line by line. In the exemplary embodiment illustrating a first implementation of the invention, the image is delivered by a panoramic thermal camera. Referring to FIG. 1, a camera such as this is usually provided with a linear sensor 1 constituted by an array of n photosensitive cells, positioned on a cylindrical support 3. On this array of n photosensitive cells there is focused an observation sector by means of an optic focusing system 2. The charges integrated into each cell are read in a register 4 and delivered in the form of a luminance signal which, after electronic processing in a circuit 5, gives the video signal. The variations of the video signal therefore express the variations in temperature of the observation field analyzed, column by column, on p columns of n pixels. Under these conditions, the detection of the horizon is done from the luminance values of an image of the field of observation analyzed column by column.

The earth's horizon may be defined as the boundary between the sky and the earth. In thermal imaging, the sky and the earth have different mean temperatures, the sky being always cooler than the earth. The horizon is therefore a continuous place where a sharp separation occurs in temperature. This sharp variation is expressed, in the context of the present invention, by a jump.

Indeed, the invention relies on a modelling of the curve representing the variations in luminance of each of the rows of values by a step function or Heaviside function. The approach followed by the invention is therefore an overall approach which, by an optimization processing operation taking account of all the luminance values of a given row, tends to select a step function the jump of which is located in a position that indicates the position of the horizon on the column considered. The method according to the invention may be applied without distinction to a camera for the analysis of images in columns or in lines. In the following development, this method is first of all applied to an analysis of images in columns, performed by the panoramic camera, and then applied to an analysis of images in lines with variants of implementation.

More precisely, referring to FIGS. 2a to 2c, which give a threefold representation of the curve $S_k$ of the luminance values $L_{jk}$ along an order k column as a function of the positions 1 to n cf the points of the column, the invention proposes the modelling of the curve $S_k$ according to the following successive steps:

the sampling of the signal of luminance variation in n values distributed along the order k column;

the modelling of the curve $S_k$ at each position i in the column k, i varying from 1 to n, by a step function $\alpha_i f_i$ defined on the basis of:

- a normed step function $f_i$, the jump of which is located at the position i, and of
- the jump amplitude $\alpha_i$ which enables the closest possible fitting with variations in the luminance signal of the column: the amplitude $\alpha_i$ is determined by minimizing the error between the n luminance values $L_{jk}$ of the $k^{th}$ column and the values of the function respectively at the same position (thus, the value of $\alpha_i$ results from the matching of the horizontal parts of the step function according to a process described hereinafter);

and the selection of the position $i_{hk}$ of i corresponding to the level of the horizon on the $k^{th}$ column considered. This selection of the position $i_{hk}$ is done by choosing that step function, from among the set of n step functions associated with all the positions i and determined at the previous step, which has the minimum error with respect to the variations of luminance signal $S_k$ on the entire column k considered. The isolated high variations in luminance, which do not correspond to the horizon, are therefore eliminated. This shows the value of the overall row-wise approach implemented by the invention.

To illustrate these steps, solid lines in figure 2a and 2b are used to show the functions of modelling $\alpha_{i'} f_{i'}$ and $\alpha_{i''} f_{i''}$ of the curve $S_k$ for respective positions i' and i''. FIG. 2c uses dashes to show the above functions as well as solid lines to show the modelling function $f_{hk}$ determined at the position $i_{hk}$ which corresponds to the position of the horizon on the $k^{th}$ column.

To obtain access to the step frnction $\alpha_i f_i$, the representative curve of which most closely fits the curve $S_k$ for each position i, one possible method is carry out a least mean squares minimization of the error $e_i$ as a function of a variable coefficient or amplitude:

$$e_i = [l_{jk} - \alpha f_i]$$

The search for this minimum leads to the value $\alpha_i$ of $\alpha$ which verifies that the error $e_i$, squared, is minimal.

The normed step function $f_i$ used should be centered on a column, i.e. the sum of the values assumed by this function on this column should be null. In effect, it is imperative to preserve the mean luminance level of the image, column by column, owing to the limited power of the signal emitted by the camera. An example of a "centered" step function is given by the following expressions:

$$f_i(j) = -(n-1) \text{ for } j \text{ belonging to } [1,i]$$

$$f_i(j) = 1 \text{ for } j \text{ belonging to } [i+1,n]$$

which verifies the condition laid down by the centering:

$$-(n-1)i + i(n-1) = 0$$

Figure 3A:
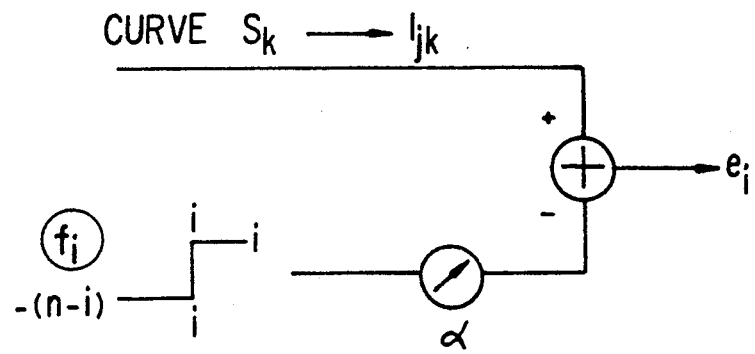
FIGS. 3a to 3b are two block diagrams illustrating the formation of the error committed in modelling the luminance signal of a given column.

Symbolically, FIG. 3a expresses the shaping the error $e_i$ by difference between the luminance values $l_{jk}$ of the curve $S_k$ and the respective values of the normed step function $f_i$ to which the variable coefficient $\alpha$ is applied.

In matrix notation, let L be the matrix of the luminance values corresponding to the curve $S_k$ for all the levels of the $k^{th}$ column, T the matrix transposition symbol, F the matrix of the values of the normed step function $f_i(j)$. The error $e_i^2$ then has the expression:

$$e_i^2 = (L - \alpha F)^T (L - \alpha F) \quad (I)$$

The value of i which makes $e_i^2$ minimal ascertai that the derivative of $e_i^2$ is null. The value of the amplitude $\alpha_i$ of the step function that smooths the curve $S_k$ to the utmost extent is determined by cancelling this derivative. The value of $\alpha_i$ is then given by the expression:

$$\alpha_i = L^T F / F^T F \quad (II)$$

In replacing $\alpha$ by its value c determined by the formula (II) in the expression of the error $e_i^2$ (formula (I)), the minimal error $e_{im}$ for the corresponding level i is then given by:

$$e_{im}^2 = L^T L = (L^T F)^2 / F^T F \quad (III)$$

For each level i, the formula (II) therefore gives the value of the amplitude of the step function that achieves the utmost smoothing, in terms of the least mean squares, of the curve $S_k$, and the formula (III) gives the value of the error corresponding to the smoothing thus determined. According to the structure of the formula (III), this error measures the difference in energy values between the light energy $L^T L$ of the column k and a "modelled" light energy written as Q, obtained by the action of the normed step function.

The all the errors $e_{im}$, called $e_m$, corresponds to the step function $f_{hk}$ the representative curve (FIG. 2c) of which most closely fits the curve $S_k$ for all the "i"s of the $k^{th}$ column. The position $i_{hk}$ of the leap of this function $f_{hk}$ locates the position of the horizon on the column considered. The minimum value $e_m$ of the error $e_{im}$ corresponds, according to the formula (III), to the maximum value of the quantity Q.

Thus, in respectively writing $a_i$ as the sum of the luminance values $I_{jk}$ of the points j located between the positions 1 and i, and $b_i$ as the sum of the values $1_{jk}$ of the points j located between the positions $i+1$ and n of the column considered, the value $i_{hk}$ of i, which indicates the position of the horizon on the column considered, maximizes the analytical expression $q_{ik}$ of the light energy Q, namely:

$$(-(n-1)a_i + ib_i)^2 / i(n-1) \quad (IV)$$

To arrive more explicitly at the type of light energy distribution that operates in the expression (IV), a variant of the method according to the invention consists in modelling the representative curve of the luminance values of each column of the analyzed image by a combination of two unity step functions $f_1$ and $f_2$, which gives greater flexibility of modelling.

The two step functions are defined so as to be decorrelated with respect to each other. An exemplary definition is given by the following expressions:

$$f_1(j) = 1 \text{ and } f_2(j) = 0 \text{ for } j \text{ belonging to } [1,i]$$

$$f_1(j) = 0 \text{ and } f_2(j) = 1 \text{ for } j \text{ belonging to } [i+1,n]$$

The remaining steps of the method according to the invention then take place according to the same type of scheme as in the case of approximation by a single step function:

the determination of two multiplier coefficients (or amplitudes) $\alpha_i$ and $\beta_i$ which minimize the error:

$$e_i = 1_{jk} - (\alpha_i f_1 + \beta_i f_2)$$

and the selection of the' value $i_{hk}$ of i corresponding to the smallest of the errors $e_i$.

Figure 3B:
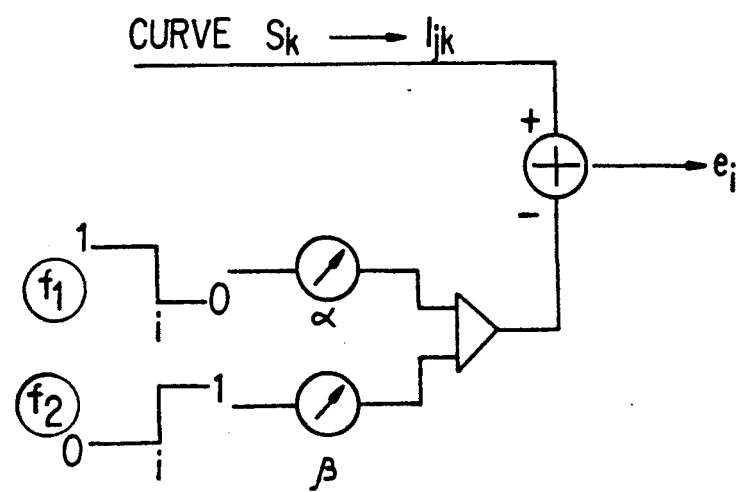

In FIG. 3b, a block diagram symbolizes the formation of the error $e_i$ obtained by difference between the luminance values $j_{jk}$ of the curve $S_k$ and the respective values of the two step functions $f_i$ and $f_2$ to which the coefficients $\alpha_i$ and $\beta_i$ are applied. Under these conditions, by direct computation or by analogy with the analysis using only one step function, the minimum error $e_{im}$, for a given i, is expressed by means of the matrix notations by the expression:

$$e_{im}^2 = L_T L - [(L^T F_1)^2/F_1^T F_1 + (L^T F_2)^2/F_2^T F_2]$$

The search for the value $i_{hk}$, which corresponds the position of the horizon on the column considered, is identified, in the context of the invention, with the search for the value of i for which the error $e_i$ is the smallest of all on the same column. Now, this smallest error, called $e_m$, corresponds, according to the previous expression, to the maximum value of:

$$(L^T F_1)^2/F_1^T F_1 + L^T F_2)^2/F_2^T F_2$$

Thus, by developing these matrix expressions by means of the notations $a_i$ and $b_i$ defined here above, by writing the light energy of the column k as $l_k$, we get:

$$e_{im} - l_k - q_{ik}$$

with $$l_k = (l_{jk})^2 \text{ and } q_{ik} = a_i^2/i + b_i^2/*(n-1) \quad (V)$$

The value $i_h$ of i is therefore the value corresponding to the maximum value $q_{Mk}$ of the quantities $q_{ik}$. This expression must be compared with the expression (IV) obtained in t.he contex of a modelling using only one step function the difference between the expressions (IV) and (V) is indeed a constant equal to the mean light energy of the column considered:

$$s_k^2/n$$

with $s_k = a_i + b_i =$ sum of the luminance values of the column k.

Thus, each of the values $j_{hk}$ determined is the position for which the sum $q_{ik}$ of the mean light energy values within and beyond this position is the maximum in each of the p columns; since each value $i_{hk}$ is the position of the horizon on the corresponding column, the ste of the p values $i_{hk}$ gives the position of the horizon modelled point by point on the entire image.

In order to display the horizor thus modelled by a continuous curve, there is a known way of smoothing a set of points, by a curve or a straight line (in using, for example, the Hough transform or a linear regression). However, the above-described method routinely gives a position of the horizon for each column, even when there is no horizon present at this column (for example, when the horizon forms an angle of more than 45° with the horizontal). A smoothing from all the positions determined by the method according to the invention would be disturbed by the erroneous positions resulting therefrom, especially for an approximation by a straight line.

To neutralize the disturbing effect of these aberrant positions, it is useful to introduce a weighting coefficient defining the degree of certitude of the different positions determined by the method of the invention. This weighting may be advantageously represented by a signal-to-noise ratio (S/N) which is a function of the value of the minimum error $e_m$ committed in modelling the curve $S_k$ by the curve representing the step function $f_{hk}$ selected for the column considered. This approach is justified by the fact that a step function having a relatively high error has little chance of corresponding to a real transition between the sky and the earth. The signal S/N may, for example, be defined for the $k^{th}$ column as the relative difference between the light energy $l_k$ of this column and the square of the minimal error $e_m$ selected for this column, namely:

$$S/N(k) = (l_k - e_m^2)/e_m^2$$

or again, according to the expressions (V):

$$S/N(k) = q_{Mk}/(l_k - q_{Mk})$$

Ultimately, it is necessary to look for the straight line (D), the position and slope of which minimize the following expression:

$$\Sigma_k S/N(k) \times \text{distance } [\text{level } i_{hk}, D] \quad (VI)$$

$i_{hk}$ being the position selected as representing the position of the horizon according to the method of the invention for the $k^{th}$ column, and S/N (k) being the degree of certitude of this level.

The method according to the invention can also be applied to a camera carrying out a linewise analysis of the image of the field of observation. To apply the method of the invention to a camera such as this, several variants are possible:

direct application: the search for the position of the horizon is done linewise, in the same way as it is done columnwise; the result obtained is lower in quality than that obtained from the columnwise determination for the horizons close to the horizontal, owing to the lack of precision that then appears in this zone;

implementation of an image memory in order to arrange all the information elements column by column; this approach is costly and may introduce a undesirable period of delay in the determinatior of the horizon;

the use of the light energy of the preceding frame: the expression (V), the maximum value of which determines the position of the horizon on a given column k, may also be written by bringing into play the sum $s_k$ of the luminace values on this column:

$$q_i = a_i/i + (s_k - a_i)^2/(n-i) \quad (V)b$$

Since the image is relatively stable from one frame to the other, it is enough to take the value obtained on the previous frame for $s_k$. This approximation is justified by the fact that the variation in light energy from one frame to the next one may be considered to be negligible.

Figure 4:
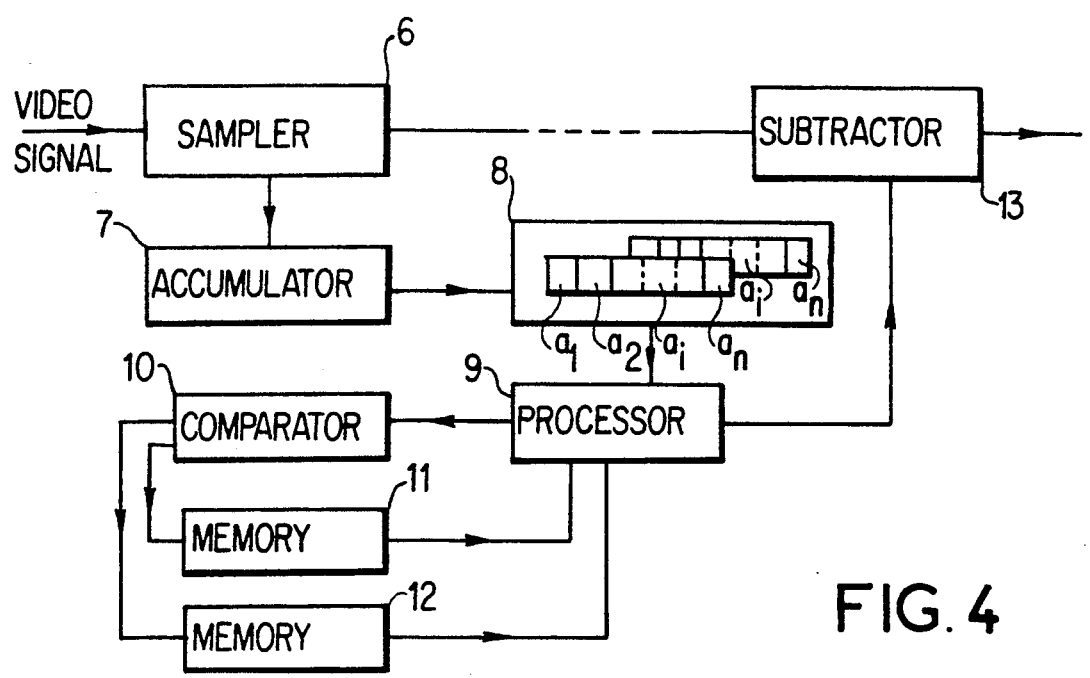
FIG. 4 shows the horizon detection device according to the invention.

One mode of implementation of the method according to the invention, adapted to an analysis of images in column mode or in line mode, is described hereinafter with reference to FIG. 4.

In column mode, the variations in luminance of the levels of a same column k, after digital sampling in the sampler 6, are accumulated successively in an accumulator 7, then these partial summations ($a_{1k}$, $a_{2k}$..., $a_{ik}$, ..., $a_{nk}=s_k$) are memorized in a double flip flop memory 8. Then, a processor 9 makes a computation, for each level i of the column k considered, of the sum of the mean light energy levels above and below the level i, namely the quantity $q_i$ already encountered:

$$q_i = a_{ik}^2/i + (a_{nk} - a_{ik})^2/n - i \qquad (V)c$$

The quantities thus computed are applied to a comparator 10 which makes it possible, by the successive comparison of these quantities two by two, to determine the order $i_h$ corresponding to the maximum of these quantities and, hence, according to the method of the invention, corresponding to the position of the horizon on the column considered. The values $i_{hk}$ for all the columns of the image analyzed, are memorized in a memory 11. It is advantageous, to preserve the weighting value S/N of the levels thus selected, to memorize also the corresponding maximum quantities $q_{Mk}$ in another memory 12. The processor 9 then makes a computation, from the values given by the memories 11 and 12, of the parameters of the linear regression line that smoothens the determined levels by the method of the invention using the formula (VI). The processor 9 then delivers a high luminance signal corresponding to the level of the point of the linear regression line in the column considered. This signal is applied, through a subtractor 13, to the level corresponding to the digitized luminance signal in such a way that the luminance value resulting therefrom at the level considered is inverted in value with respect to the initial value. Thus, the synthesizing straight line, expressing the horizon determined by the method of the invention, appears in contrast on the scene as displayed on a control screen from the video signal given by the camera.

In line mode, the double flip flop memory 8 is used as follows: the luminance values cumulated column by column up till the $i^{th}$ line ($a_{i1}$, $a_{i2}$, ..., $a_{ik}$, ..., $a_{ip}$) are stored in one of the flip flop memories, and the luminance values ($a_{n1}$, $a_{n2}$, ..., $a_{nk}$, ..., $a_{np}$) of the columns of the preceding frame are stored in the other memory. The processor 9 then makes a computation, in a manner similar to that of the column mode, of the quantities having as their expression the formula (V) adapted according to (V)c, and sends the maximum luminance signals corresponding to the linear regression line, computed on the basis of the values memorized in the memories 11 and 12, to the subtractor 13.

The invention is not limited to the embodiment described and represented herein. In particular, the realtime operation of the implementation device according to the invention is made possible by the use of a signal processor with appropriate capacity, for example a VLSI (very large-scale integrated) circuit, or by a statistical processing of the luminance values given by the camera; for example the assessment of the step functions can be done from the luminance values sampled every x pixels, by reduction of the horizon search zone, or by searching for the horizon every y columns. Furthermore, the horizon detection card may be laid out at different sites: directly at the level of the delivery of the luminance signal of a panoramic camera, or at the level of the electronic package containing the different processing cards. The video signal is then sampled beforehand so that it can be exploited on the basis of digital values.

What is claimed is:

1. An image processing method for the detection of the horizon from the video signal delivered by a camera forming the image of the observation field analyzed row by row, wherein said image processing method comprises the following steps:

the digital processing of the video signal to obtain the sampled luminance values of the analyzed image row by row;

the determination, for each position i of a given row k, of a step modelling function, the jump of which is located at i and the amplitude of which is computed so as to give a minimal error of all the values assumed by the function with respect to all the values of the luminance signal of the row considered;

the selection of the value $i_{hk}$ of i, corresponding to the position of the horizon on the row considered, for which the step function determined at the previous step has an amplitude computed so as to give the smallest of all the minimal errors;

the reproduction of the preceding steps for all the rows of the analyzed image and the display of a smoothing curve, representing the horizon, from the set of the value $i_{hk}$ sselected.

2. An image processing method for the detection of the horizon according to claim 1, wherein the step modelling function is the sum of two decorrelated step functions, the amplitudes of which have values such that, for each position i of a given row, the error between the values of the modelling function and the set of the sampled values, taken respectively at the corresponding level by the luminance signal, is minimized.

3. An image processing method according to either of the claims 1 or 2, wherein the level $i_{hk}$ of the position of the horizon on the order k row is that for which the sum of the mean light levels below and above this level is maximal in the row considered.

4. An image processing method according to either of the claims 1 or 2, applied to a columnwise analysis of images, wherein the image is cut up into p columns, wherein i varies linewise from 1 to n and wherein the selected values $i_{hk}$ directly indicate the height of the horizon on the image.

5. An image processing method according to either of the claims 1 or 2, applied to a linewise analysis of images, wherein the image is cut up into n lines, wherein i varies columnwise from 1 to p and wherein the selected values $i_{hk}$ either directly or indirectly indicate, after the processing of the luminance values by columns, the height of the horizon on the image.

6. An image processing device for the detection of the horizon from the video signal delivered by a camera forming the image of the observation field analyzed row by row, wherein the video signal is digitablly processed to obtain sampled luminance values of the analyzed image row by row; for each position i of a given row k, a step modelling function is determined, the jump of which is located at ia dn the amplitdue of which is computed so as to give a minimal error of all the values assumed by the function with respect to all the values of the luminance signal of the row considered, a value of $i_{hk}$ of i, corresponding to the position of the horizon on the row considered, is selected for which the determined step function has an amplitude computer so as to give the smallest of all the minimal errors, the value $i_{hk}$ for all the rows of the analyzed image is determined and s moothing curve, representing the horizon, from the set of values $i_{hk}$ selected is displayed, wherein the determination of said step modelling function is performed using a columnwise analysis in which the image is cut up into p columns, i varies linewise from 1 to n, and the selected values $i_{hk}$ directly indicate the height of the horizon on the image, said device comprising:

a signal sampler (b), the digital values of which are successively addressed to an accumulator to add up these digitized values as when they appear, a flip flop memory that is coupled to the accumulator and memorizes the cumulated values, a signal processor which, on the basis of the values transmitted by the memory and for each position i of each column k of the luminance values, determines the quantity $q_i$ equal to the sum of the mean light energies above and below the position i, a comparator coupled to the processor to select the quantity $q_{Mk}$ having the maximum value for the order k column, memories coupled to the comparator to respectively memorize the quantities $q_{Mk}$ and the corresponding value $i_{hk}$ of i, and a subtractor mounted on the circuit delivering the sample video signal and on the processor to subtract, from the signal coming from the sampler, a maximum luminance signal coming from the processor for the level of each column in which the point of the straight line, representing the position of the horizon on the column considered, is positioned, this straight line being computed in the processor by linear regression by application of the values of levels memorized in the memory and of the corresponding weighting values memorized in the memory.

7. An image processing device for the detection of the horizon from the video signal delivered by a camera forming the image of the observation field analyzed row by row, wherein the video signal is digitally processed to obtain sampled luminance values of the analyzed image row by row; for each position i of a given row k, a step modelling function is determined, the jump of which is located at i and the amplitude of which is computed so as to give a minimal error of all the values assumed by the function with respect to all the values of the luminance signal of the row considered, a value of $i_{hk}$ of i, corresponding to the position of the horizon on the row considered, is selected for which the determined ste function has an amplitude computed so as to give the smallest of all the minimal errors, the value $i_{hk}$ for all the rows of the analyzed image is determined and a smoothing curve, representing the horizon, from the set of values $i_{hk}$ selected is displayed, wherein the determination of said step modelling function is performed using a linewise analysis in which the image is cut up into n lines, i varies linewise from 1 to p, and the selected values $i_{hk}$ either directly or indirectly indicate, after processing the luminance values by column, the height of the horizon on the image, said device comprising:

a signal sampler (b), the digital values of which are successively addressed to an accumulator to add up these digitized values as and when they appear, a pair of flip flop memories that is coupled to the accumulator and memorizes the cumulated values, a signal processor which, on the basis of the values transmitted by the memory and for each position i of each column k of the luminance values, determines the quantity $q_i$ equal to the sum of the mean light energies above and below the position i, a comparator coupled to the processor to select a quantity $q_{Mk}$ having the maximum value for the order k column, memories coupled to the comparator to respectively memorize the quantities $q_{Mk}$ and the corresponding values $i_{hk}$ of i, and a subtractor mounted on the circuit delivering the sampled video signal and on the processor to subtract, from the signal coming from the sampler, a maximum luminance signal coming from the processor for the level of each column in which the point of the straight line, representing the position of the horizon on the column considered, is positioned, this straight line being computed in the processor by linear regression by application of the values of levels memorized in the emmory and of the corresponding weighting values memorized in the memory, wherein a first of the flip flop memories successively memorizes the partial summing operations of the luminance values to cumulate and store the luminance values column by column and wherein a second of the flip flop memories stores the luminance values of the columns of the previous image frame, wherein the quantities $q_i$ are computed in the processor from the partial summing operations of the luminance values of the columns coming from the first of the flip flop memories and from the summing operations of the luminance values of the columns coming from the second of the flip flop memories.

* * * * *